United States Patent [19]

Park et al.

[11] Patent Number: 5,286,836
[45] Date of Patent: Feb. 15, 1994

[54] PROCESS FOR FORMING POLYESTERS

[75] Inventors: Sang S. Park, Seoul; Hoi W. Yoo, Kyungki; Chung Y. Kim; Hyun N. Cho, both of Seoul, all of Rep. of Korea

[73] Assignee: Korea Institute of Science and Technology, Seoul, Rep. of Korea

[21] Appl. No.: 53,553

[22] Filed: Apr. 27, 1993

Related U.S. Application Data

[63] Continuation of Ser. No. 743,836, Aug. 2, 1991, abandoned.

[30] Foreign Application Priority Data

Oct. 19, 1990 [KR] Rep. of Korea .............. 16698/190

[51] Int. Cl.$^5$ .................. C08G 63/02; C08G 63/78; C08G 63/82
[52] U.S. Cl. ................... 528/275; 528/272; 528/279; 528/285
[58] Field of Search .............. 528/272, 275, 279, 285

[56] References Cited

U.S. PATENT DOCUMENTS

| | | | |
|---|---|---|---|
| 3,528,946 | 9/1970 | Stewart et al. | 528/308.5 |
| 3,752,866 | 8/1973 | Doerr | 528/274 |
| 3,803,099 | 4/1974 | Okuzumi | 528/308.5 |
| 4,347,351 | 8/1982 | Swart | 528/274 |

*Primary Examiner*—John Kight, III
*Assistant Examiner*—Terressa M. Mosley
*Attorney, Agent, or Firm*—Leydig, Voit & Mayer, Ltd.

[57] ABSTRACT

A process for forming polyesters that comprises the steps of esterifying a terephthalic acid and an ethylene glycol to produce an esterification product containing a bis (betahydroxyethyl) terephthalate, and continuously polycondensing the obtained esterification product to form a polyester. In both the esterifying step and the polycondensing step, a reaction catalyst consisting of a compound of antimony and a compound of titanium is used. The weight ratio of the compound of antimony to the compound of titanium is 0.01 to 100. The process of the present invention can considerably reduce both the esterification time and the polycondensation time and provides good color, reduced diethylene glycol content and reduced condensation of terminal carboxyl groups in the resulting polyesters.

19 Claims, No Drawings

PROCESS FOR FORMING POLYESTERS

This is a continuation of copending application Ser. No. 07/743,836 filed on Aug. 12, 1991, now abandoned.

BACKGROUND OF THE INVENTION

The present invention relates to a process for forming polyesters and, more particularly, to a process for forming polyesters wherein catalysts are added.

At the present time, industrially-formed polyesters, in particular polyethylene terephthalates, are widely used for manufacturing fibers, films, and other industrial materials, in virtue of their high degree of crystallization, high softening point, and other various superior properties in terms of strength, chemical resistance, thermal resistance, weather resistance, electric insulation; etc. Conventional methods for forming such polyethylene terephthalates include, for example, a method for directly esterifying a terephthalic acid and an ethylene glycol by heating them at reaction temperatures ranging from 200° C. to 280° C. under atmosphere or pressure. Polyethylene terephthalates also can be formed by producing polymers, that is, bis (betahydroxyethyl) terephthalate and/or its low polymer (hereinafter, referred to as esterified compounds) by utilizing an ester interchange process that involves heating a dimethyl terephthalate and an ethylene glycol in the presence of catalysts at reaction temperatures ranging from 160° C. to 240° C., and continuously polycondensing the produced, esterified compounds in the presence of polymerization catalysts at reaction temperatures ranging from 260° C. to 300° C. in a high vacuum, in order to produce high polymers. Recently, the above-mentioned direct esterification method is mainly adopted to form industrial polyesters, since it is better than the latter ester interchange method, in terms of economical advantage.

Generally, reaction catalysts are used to accelerate and smoothly advance a reaction in producing polyesters. These catalysts include various compounds of metals, such as antimony, titanium, germanium, tin, zinc, manganese, lead; etc. It is well-known that the color and stability of the resulting polyester product and the reaction velocity are considerably varied depending upon the kinds of catalysts used. The reaction of forming polyesters is carried out in the presence of catalysts for a long time and at a high temperature. Accordingly, the reaction for forming polyesters of a high degree of polymerization in a short time is accompanied by several undesirable side reactions that result in coloring the polyester product yellow and increasing the content of diethylene glycol and the concentration of terminal carboxyl groups above their optimum levels. Consequently, the physical properties of the produced polyesters, for example, melting point, strength; etc., are deteriorated. Therefore, it is important to produce polyesters that can exhibit good color and superior physical properties even at a high reaction velocity. At the present time, an antimony compound, particularly antimony trioxide, is mainly used as an industrial polycondensation catalyst, since it is inexpensive and exhibits good catalytic activity and good thermal stability. However, antimony trioxide is hardly soluble in ethylene glycol or other reaction mixtures and tends to be precipitated during the reaction, thereby causing the resulting polyester to be colored gray or yellow-green or the transparency thereof to be decreased. These are more remarkable if the amount of the catalyst used and the reaction temperature are increased to improve productivity.

In order to provide catalysts solving the above-mentioned problems, there have been several methods proposed to reduce the esterification reaction time and the polycondensation reaction time and to produce polyesters exhibiting good color and superior physical properties. However, any one of them can hardly solve the above-mentioned problems. As a method for reducing the reaction time, there have been known, for example, a method that involves reacting a compound of silicone with a compound of titanium (U.S. Pat. No. 3,927,052), a method that involves dissolving antimony trioxide, a compound of cobalt and a compound of phosphorus in ethylene glycol (Japanese Laid-open Patent Publication No. Sho 53-51,295), and a method in which a compound of antimony is used with an organic acid (Japanese Laid-open Patent Publication No. Sho 60-166,320). However, these methods can not reduce both the esterification reaction time and the polycondensation reaction time. They also generate several problems in physical properties of the produced polyester in that the produced polymer is colored light yellow or the contents of diethylene glycol or terminal carboxyl groups are increased. On the other hand, as a method for improving the color and physical properties of the produced polymer, there have been known, for example, a method in which compounds of cobalt and alkali metal are used together with a compound of antimony (Japanese Laid-open Patent Publication No. Sho 58-117,218), a method in which a compound of antimony is used with a compound of tin (Japanese Patent Publication No. Sho 49-31,317), and a method in which antimony, tin, cobalt and alkali are used together with a compound of phosphorus(Japanese Laid-open Patent Publication No. Sho 62-265,324). However, these methods can not improve the color, transparency and physical properties of the produced polymer at the same time and provide any important advantage in terms of the reduction of the reaction time. As apparent from the above description, it is important to reduce both the esterification time and the polycondensation time and provide good color and superior physical properties of the resulting polymer, in order to obtain high quality polyesters with high productivity.

SUMMARY OF THE INVENTION

Therefore, an object of the present invention is to provide a process for forming polyesters of a high quality which can considerably reduce both the esterification time and the polycondensation time and provide good color, reduced content of diethylene glycol and reduced condensation of terminal carboxyl groups in the resulting polyesters.

In order to accomplish this object, the present invention provides a process for forming polyesters that comprises the steps of esterifying a terephthalic acid or a dicarboxylic acid containing the terephthalic acid as an essential ingredient, derivatives thereof, an ethylene glycol or a glycol containing the ethylene glycol as an essential ingredient, and derivatives thereof, to produce an esterification product containing a bis (beta-hydroxyethyl) terephthalate and/or its low polymer as an essential ingredient, and continuously polycondensing the obtained esterification product to form a polyester, wherein the said polycondensing step, a polymerization catalyst, consisting of a compound of antimony and a compound of titanium, is used. In one aspect of the present invention, the weight ratio of the compound of antimony to the compound of titanium is 0.01 to 100. The polymerization catalyst is dissolved in a solvent, consisting of an ethylene glycol or containing it as an essential ingredient. It is preferred that the weight ratio of the compound of antimony to the compound of titanium is 0.1 to 9.0. If this weight ratio of the polymerization catalyst is less than or more than the above-mentioned range, the reaction rate may be considerably lowered or the resulting polyester may be colored yellow-green. Particularly excellent effects can be obtained when using the polymerization catalyst, which was already dissolved in a glycol, under the condition that it is heated at 20° C. to 200° C., more preferably at 30° C. to 150° C. When a compound of antimony, particularly an antimony trioxide, is dissolved in an ethylene glycol and then maintained at room temperature for a long time, a precipitation is generated that adversely affects stability. However, the catalyst system formed by the above-mentioned process provides high stability. For example, even when the catalyst is maintained at 10° C. below zero for a long time, no precipitation is generated. The compounds of antimony that are used for the polymerization catalyst include antimony oxides, such as antimony trioxide, antimony tetraoxide or antimony pentoxide, antimony halides, such as antimony trichloride or antimony trifluoride, antimony carboxylates, such as antimony triacetate, antimony tristearate, antimony tribenzonate, antimony tri-2-ethylhexanoate or antimony trioctoate, a compound of antimony combined with ether, such as antimony trimethoxide, antimony ethylene glycoxide, antimony triisopropoxide, antimony tri-n-butoxide and antimony triphenoxide, antimony hydroxides and antimony sulfides. Particularly, antimony trioxide, antimony triacetate, and antimony ethylene glycoxide are preferred. The compounds of titanium that are also used for the polymerization catalyst include titanium halide, such as titanium tetrachloride and a compound of titanium combined with ether (hereinafter, referred to as a compound of ether-combined titanium). This compound of ether combined titanium has the following general formula (I):

$$Ti(OR)_4 \quad (I)$$

In the above formula (I), R is aliphatic or substitutional alkyl groups or aromatic aryl groups. Of course, the four R groups can be the same or different from one another. For example, R includes methyl, ethyl, n-propyl, isopropyl, ethylene glycol, n-butyl, isobutyl, sec-butyl, tert-butyl, n-amyl, acetyl-isopropyl, neohexyl, isohexyl, n-hexyl, heptyl, octyl, decyl, dodecyl, octadecyl, cyclohexyl, phenyl, and benzyl. An alkyl group containing not more than about 8 carbon atoms is preferred. Another compound of titanium is that of the following general formula (II), which is produced by the coordination of the compound of the general formula (I) and a compound of phosphite [HP(O)(OR')₂] in the ratio of 1:2.

$$(RO)_4Ti.[HP(O)(OR')_2]_2 \quad (II)$$

In the above general formula (II), R is the same as R in the general formula (I), while R' is aliphatic or substitutional alkyl groups or aromatic aryl groups. R' can be the same or different from R. For example, formula (II) includes tetraisopropyl di(dimethyl)phosphito titanate, tetra-n-butyl di(diisopropyl) phosphito titanate, tetraisopropyl di(dioctyl)phosphito titanate, tetraoctyl di(distearyl)phosphito titanate, tetraoctyl di (ditridecyl)phosphito titanate, and tetra(2,2-diallyoxymethyl) butyl di(ditridecyl)phosphito titanate. Another compound of titanium may be used that includes a compound of monoalkoxytitanate, such as isopropyl triisostearoyltitanate and isopropyl tri(N-ethylene diamino)ethyltitanate, a compound of chelate titanate, such as di(cumyl)phenyl oxoethylene titanate and di(dioctyl) phosphato ethylene titanate, a compound of neoalkoxytitanate, such as neopentyl(diallyl)oxytri(N-ethylenediamino)ethyltitanate and neopentyl (diallyl)oxytri(dodecyl)benzenesulfonyltitanate, and a compound of cycloheteroatom-titanate such as cyclo (dioctyl)pyrophosphatodioctyltitanate and dicyclo(dioctyl) pyrophosphatotitanate. Good results may be obtained by using one or more of the above-mentioned various compounds of antimony, together with one or more of the above-mentioned various compounds of titanium. Although not limited, it is preferred that the amount of catalyst used in the present invention is determined to provide a sufficient reaction rate depending on the reaction condition. Normally, the proper ratio of the total amount of compounds of antimony and titanium to the amount of the resulting polyester polymer is the range of 100 ppm to 1,000 ppm. In the range of 250 ppm to 750 ppm, a more desirable result can be obtained. Addition of catalyst may be carried out during or after the esterification and before the polycondensation. It is most advantageous to carry out the addition of catalyst before the esterification to reduce the total reaction time, which improves productivity. In carrying out the direct esterification, which uses a terephthalic acid and an ethylene glycol, it is preferable to add the catalyst into a slurry of the terephthalic acid and the ethylene glycol. Alternatively, a good result may be obtained by adding the catalyst before the esterification and before the polycondensation individually. In direct esterification, reaction temperatures ranging from 200° C. to 280° C., particularly ranging from 220° C. to 260° C., are advantageous and well-known in the technical field to which the present invention pertains. It is also possible to carry out the reaction under atmosphere or pressure. On the other hand, in the ester interchange reaction, the conventionally-used catalyst is substituted by one of the present invention and reaction temperatures ranging from 160° C. to 240° C. are used. The esterification products are polycondensed at temperatures ranging from 260° C. to 300° C., particularly ranging from 275° C. to 290° C. In the polycondensation, the temperature and the vacuum degree rise slowly. A final vacuum degree of no more than 1 torr is advantageous. Also, other catalysts can be used together with the above-mentioned catalysts within the scope of the present invention. For example, these catalysts include a compound of germanium, such as germanium oxide, a compound of tin, such as dibutyltin oxide and n-butylhydroxytin oxide, a carboxylate compound of zinc, manganese and lead, such as zinc acetate, manganese acetate and lead acetate, a compound of alkali metal, such as sodium or potassium hydroxide and potassium acetate, and a compound of alkali earth metal, such as magnesium or calcium hydroxide and calcium acetate.

The process of the present invention can be advantageously used when polyester polymers are formed by reacting terephthalic acid or dicarboxylic acid containing the terephthalic acid as an essential ingredient and derivatives thereof and ethylene glycol or glycol containing the ethylene glycol as an essential ingredient. The representative acid and derivatives thereof are terephthalic acid and dimethyl terephthalate. The representative glycol is ethylene glycol. Also, the method may be used for forming polyester copolymers containing at least one of three ingredients. However, it is preferred that the content of the third ingredient does not exceed 40 molar %. The third ingredient may be terephthalic acid and derivatives thereof, for example, aromatic, aliphatic and alicyclic dicarboxylic acids, such as phthalic acid, isophthalic acid, naphthalenedicarboxylic acid, diphenylsulfon dicarboxylic acid, diphenylmethane dicarboxylic acid, diphenylether dicarboxylic acid, diphenoxyethane dicarboxylic acid, malonic acid, succinic acid, glutaric acid, adipic acid, azelaic acid, sebacic acid, cyclohexane dicarboxylic acid, decalindicarboxylic acid, and ester derivatives thereof, such as methyl ester, ethyl ester and compounds of phenylester. Also, examples of the glycolic ingredient are aliphatic, aromatic and alicyclic diol, such as 1,3-propane diol, 1,2-propane diol, 1,4-butane diol, 1,3-butane diol, 1,5-pentane diol, 1,6-hexane diol, 1,4-cyclohexane dimethanol, bisphenol A, bisphenol S, bishydroxyethoxy bisphenol A and tetrabromo bisphenol A.

Also, it is advantageous to add compounds of polyfunctional cross-linking agent, such as trimellitic acid, trimesic acid, pyromellitic acid, trimethylolprophane, glycerine and pentaerythritol, and compounds of monofunctional terminating agents, such as monomethoxypolyethylene glycol, stearyl alcohol, palmitic acid, benzoic acid, and naphthoic acid.

Also, thermal stabilizers which are normally added in forming polyester polymers include phosphorous compounds, such as phosphoric acid, phosphorous acid, metaphosphoric acid, trimethylphosphate, triethylphosphate, triphenylphosphate, trioctylphosphate, dimethylphosphite, diethylphosphite, dicyclohexylphosphite, diphenylphosphite, dioctylphosphite, dimethylpyrophosphate, diethylpyrophosphate, diphenylpyrophosphate, dicyclohexylpyrophosphate and dioctylpyrophosphate. Antioxidants also may be added that include Iganox series, that is hinderedphenols, commercially manufactured by CIBA-Geigy Company in Germany. For example, Iganox 1010, Iganox 1076 and Iganox 1098 can be used. If desired, another additive may be used. For example, these additives include a complementary color agent, such as cobalt acetate, an ultraviolet absorbent, such as benzotriazole, an anti-softening point dropping agent, such as triethylamine, a delustering agent, such as titanium oxide, a nuclear agent, such as silica and alumina, and other compounds, such as a dyestuff, a fluorescent whitening agent, an antistatic agent and a flame retardant.

As apparent from the above description, the present invention provides a process for forming polyesters of a high quality that can considerably reduce both the esterification time and the polycondensation time and provide good color, reduced content of diethylene glycol and reduced concentration of terminal carboxyl groups in the produced polyesters as compared with conventional methods.

DETAILED DESCRIPTION OF THE INVENTION

The invention is further illustrated by the following nonlimiting examples, in which all parts are given by weight unless otherwise stated. Also, the intrinsic viscosity($\eta$) of the polymers is calculated at 30° C. by using a solution of phenol (6 parts) and tetrachloroethane (4 parts). The content of the diethylene glycol (DEG) is measured from the decomposition products of the polymers in hydrazine by gas chromotography. The color of the polymers is measured at the chip state polymers by the color diffractometer, and the L values and b values describe, respectively, lightness and the degree of yellow coloration of the polyesters. A higher L value and a lower b value indicate improved color.

EXAMPLE 1

After heating the composite catalyst solution, in which 250 ppm of antimony trioxide and 250 ppm of tetraisopropyl di(dioctyl)phosphito titanate to the amount of the resulting polyester products were dissolved in ethylene glycol at 60° C. for an hour, the heated catalyst solution was added to a slurry of ethylene glycol and terephthalic acid as a reaction catalyst. At this time, the molar ratio of the ethylene glycol and the terephthalic acid was 1.1. And then, the slurry, being added with the reaction catalysts, was fed into an esterification reactor in which esterification products were already present. Thereafter, the slurry was directly esterified under atmosphere for 210 mins. at 240° C. The resulting esterification products were fed into a polycondensation reactor equipped with an agitator and a torquemeter. Also, 100 ppm of trimethyl phosphates to the amount of the resulting polymer products were added to the esterification products. And then, the products were polycondensed for 113 mins. under pressure that was slowly dropped to 0.8 torr at a temperature that was slowly increased to 285° C. Thereafter, the polycondensed products were extruded from the lower nozzle of the reactor into cooling water in order to form chip state polymers. The characteristics of the resulting polymers are described in Table 1.

COMPARATIVE EXAMPLE 1

A slurry of ethylene glycol and terephthalic acid was directly esterified using the same processes as those in Example 1, except that catalysts were not used. The esterification was continued for 285 mins. Then, the esterification products were added with 380 ppm of antimony trioxide and 100 ppm of trimethyl phosphates to the amount of the resulting polyester products being formed in the same conditions as those in Example 1. The esterification products were polycondensed for 170 mins in order to form polymers.

COMPARATIVE EXAMPLE 2

A slurry of ethylene glycol and terephthalic acid was esterified in the same processes as those in Example 1, except for using another catalyst. That is, 380 ppm tetraisopropyl di(dioctyl) phosphito titanate were added as catalysts. The esterification was continued for 215 mins. Then, the esterification products were polycondensed in the same polymerizing conditions as those in Example 1. The characteristics of the resulting polymers are described in Table 1.

EXAMPLE 2

A slurry of ethylene glycol and terephthalic acid was added with the composite catalyst solution of 200 ppm isopropyltri (N-ethylenediamino)ethyl titanate 300 ppm of antimony triacetate which had been already heated for 30 mins. at 120° C. The slurry was esterified for 220 mins. under the same conditions as in Example 1. Thereafter, the resulting esterification products were fed into the polycondensation reactor and were polycondensed for 110 mins. therein under the same conditions as those in Example 1. The characteristics of the resulting polymers are described in Table 1.

EXAMPLE 3

After heating a catalyst solution in which 350 ppm antimony trioxide 150 ppm, titanium tetraisopropoxide and 100 ppm of dimethylphosphite were dissolved for 2 hours at 50° C., the heated catalyst solution was added to a slurry of ethylene glycol and terephthalic acid. The slurry together with the catalyst solution was esterified for 203 mins. Thereafter, the esterification products were fed to the polycondensation reactor and polycondensed for 118 mins. therein under the same conditions as those in Example 1 in order to form polymers.

EXAMPLE 4

The slurry was esterified for 198 mins. under the same conditions as those in Example 1 except that the concentrations of the catalysts were 300 ppm individually. The esterification products were fed to the polycondensation reactor and were polycondensed for 110 mins. therein in order to form polymers.

EXAMPLE 5

The slurry was esterified and polycondensed under the same conditions as those in Example 1, except that the concentrations of the catalysts were 150 ppm, respectively. After esterification for 223 mins. the esterification products were fed to the polycondensation reactor and were polycondensed for 108 mins. therein in order to form polymers.

EXAMPLE 6

The dimethyl terephthalate of 970 parts and the ethylene glycol of 640 parts, together with the reaction catalysts of the same concentrations as those in Example 1, were fed to an ester interchange reactor and esterified for 135 mins. and at a temperature rising to 220° C. Thereafter the resulting products were fed to the polycondensation reactor and were polycondensed for 102 mins. therein under the same conditions as those in Example 1 in order to form polymers.

COMPARATIVE EXAMPLE 3

The conditions of the ester interchange were the same as those in Example 6 except that the manganese acetate of 0.31 parts was added to the catalysts. After ester interchange for 210 mins. the resulting ester interchange products were added with 380 ppm antimony trioxide and 100 ppm triphenyl phosphate, based on the amount of the resulting polyester products, and polycondensed for 155 mins. under the same conditions as those in Example 1 in order to form polymers.

TABLE 1

| Examples | Intrinsic viscosity ($\eta$) dl/g | DEG content (weight %) | COOH concentration (equivalent/ton) | L value | b value |
|---|---|---|---|---|---|
| Example 1 | 0.648 | 0.71 | 24.5 | 56.5 | 1.6 |
| Comp. Example 1 | 0.643 | 1.13 | 29.6 | 56.2 | 2.3 |
| Comp. Example 2 | 0.641 | 1.35 | 31.2 | 57.2 | 5.8 |
| Example 2 | 0.640 | 0.85 | 25.2 | 55.8 | 1.7 |
| Example 3 | 0.643 | 1.11 | 28.7 | 59.1 | 2.5 |
| Example 4 | 0.651 | 0.92 | 23.5 | 57.1 | 1.8 |
| Example 5 | 0.649 | 1.15 | 26.4 | 58.7 | 2.0 |
| Example 6 | 0.650 | 0.65 | 26.2 | 58.7 | 1.7 |
| Comp. Example 3 | 0.647 | 0.95 | 26.3 | 55.1 | 2.1 |

What is claimed is:

1. A process for forming polyesters comprising esterifying either a terephthalic acid, a dicarboxylic acid containing terephthalic acid or derivatives thereof with either ethylene glycol or a glycol containing ethylene glycol, or derivatives thereof to produce an esterification product and polycondensing the obtained esterification product, wherein said esterification is conducted in the presence of a catalyst comprising one or more compounds of antimony and one or more compounds and titanium and wherein the weight ratio of the compound of antimony to the compound of titanium is 0.1 to 9.0.

2. The process according to claim 1, wherein said compound of antimony is selected from the group consisting of antimony trioxide and antimony triacetate.

3. The process according to claim 1, wherein said compound of titanium is selected from the group consisting of tetraisopropyl di(dioctyl) phosphito titanate, ispropyl tri (N-ethylene diamino)ethyltitanate, and titanium tetraisopropoxide.

4. The process according to claim 1, wherein the ratio of the total amount of compounds of antimony and titanium to the amount of the resulting polyester polymer is from about 100 ppm to about 1,000 ppm.

5. A process for forming polyesters in accordance with claim 1, wherein a solution of glycol, in which said polymerization catalyst is dissolved, is heated at temperatures ranging from about 20° C. to about 200° C. during the reaction.

6. The process according to claim 1, wherein said derivative of terephthalic acid is dimethyl terephthalate.

7. The process according to claim 1, wherein said compound of antimony is an antimony oxide selected from the group consisting of antimony trioxide, antimony tetraoxide and antimony pentaoxide, and mixtures thereof, an antimony halide selected from the group consisting of antimony trichloride, antimony trifluoride, and mixtures thereof, an antimony carboxylate selected from the group consisting of antimony triacetate, antimony tristearate, antimony tribenzoate, antimony tri-2-ethylhexanoate and antimony trioctoate, or an ether-combined antimony compound selected from the group consisting of antimony trimethoxide, antimony ethylene glycoxide, antimony triisopropoxide, antimony tri-n-butoxide and antimony triphenoxide.

8. The process according to claim 1, wherein said compound of antimony is an antimony hydroxide.

9. The process according to claim 1, wherein said compound of antimony is an antimony sulfide.

10. The process according to claim 1, wherein said compound of titanium is a titanium halide, an ether-combined titanium compound having the general formula Ti(OR)$_4$, wherein R is selected from the group consisting of aliphatic or substitutional alkyl groups and aromatic aryl groups, a compound of monoalkoxytitanate selected from the group consisting of isopropyl triisostearoyltitanate and isopropyl tri(N-ethylene diamino)ethyltitanate, a compound of neoalkoxytitanate selected from the group consisting of neopentyl (diallyl-)oxy tri(N-ethylene diamino)ethyltitanate and neopentyl (diallyl)oxy tri(dodecyl) benzenesulfonyltitanate, or a compound of cycloheteroatom titanate selected from the group consisting of cyclo (dioctyl) pyrophosphatodioctyl titanate and dicyclo (dioctyl) pyrophosphototitanate.

11. The process according to claim 10, wherein said titanium halide is titanium tetrachloride.

12. The process according to claim 10, wherein said R groups are the same.

13. The process according to claim 10, wherein said substitutional alkyl group contains about 8 carbon atoms or less.

14. The process according to claim 10, wherein said ether-combined titanium compound is titanium tetraisopropoxide.

15. The process according to claim 11, wherein said compound of titanium is a compound having the general formula:

$$(RO)_4Ti\cdot[HP(O)(OR')_2]_2$$

wherein R and R' are selected from the group consisting of aliphatic or substitutional alkyl groups and aromatic aryl groups.

16. The process according to claim 15, wherein said R and R' groups are the same.

17. The process according to claim 16, wherein said compound of titanium is tetraisopropyl di(dioctyl)-phosphite titanate.

18. The process according to claim 10, wherein said compound of monoalkoxytitanate is isopropyl tri(N-ethylene diamino)ethyltitanate.

19. The process according to claim 1, wherein the ratio of the total amount of compounds of antimony and titanium to the amount of the resulting polyester polymer is from about 100 ppm to about 1,000 ppm.

* * * * *

UNITED STATES PATENT AND TRADEMARK OFFICE
CERTIFICATE OF CORRECTION

PATENT NO. : 5,286,836
DATED : FEBRUARY 15, 1994
INVENTOR(S) : SANG S. PARK, HOI W. YOO, CHUNG Y. KIM AND HYUN N. CHO

It is certified that error appears in the above-identified patent and that said Letters Patent is hereby corrected as shown below:

ON THE TITLE PAGE:

Related U.S. Application Data

[63] Delete "2" and substitute therefore -- 12 --; and

Foreign Application Priority Data

[30] After "16698/" delete "190" and substitute therefor -- 1990 --.

IN THE SPECIFICATION:

Column 3, line 54, before "cyclohexyl" insert -- cyclopentyl, --;

Column 7, line 5, after "titanate" insert -- and --;

Column 7, line 18 after "trioxide" insert -- , -- and after "ppm" delete -- , --;

Column 7, line 40, after "150 ppm" insert -- and 350 ppm --; and

Column 7, line 52, after "135 mins." delete -- and --.

IN THE CLAIMS:

UNITED STATES PATENT AND TRADEMARK OFFICE
CERTIFICATE OF CORRECTION

PATENT NO. : 5,286,836  
DATED : February 15, 1994  
INVENTOR(S) : Sang S. Park, et al Page 2 of 2

It is certified that error appears in the above-indentified patent and that said Letters Patent is hereby corrected as shown below:

Column 8, line 37, delete "ispropyl" and substitute therefor -- isopropyl --; and Column 10, line 7, delete "11" and substitute therefor -- 1 --.

Signed and Sealed this

Fourteenth Day of March, 1995

Attest:

BRUCE LEHMAN

*Attesting Officer*         *Commissioner of Patents and Trademarks*